United States Patent [19]

Grossmann et al.

[11] 3,783,145

[45] Jan. 1, 1974

[54] THERMOPLASTIC MOLDING COMPOSITIONS ON THE BASIS OF POLYOXYMETHYLENES

[75] Inventors: Hans-Hermann Grossmann, Oberems; Karlheinz Burg, Langenhain/Taunus; Ernst Wolters, Frankfurt/Main, all of Germany

[73] Assignee: Farbwerke Hoechst Aktiengesellschaft vormals Meister Lucius & Bruning, Frankfurt/Main, Germany

[22] Filed: Nov. 24, 1971

[21] Appl. No.: 202,020

[30] Foreign Application Priority Data
Nov. 26, 1970 Germany................... P 20 58 128.6

[52] U.S. Cl...................... 260/37 AL, 260/DIG. 35
[51] Int. Cl............................................. C08g 51/04

[58] Field of Search ................. 260/37 AL, DIG. 35

[56] References Cited
FOREIGN PATENTS OR APPLICATIONS
1,133,490  11/1968  Great Britain.................. 260/37 AL
1,104,089  1/1968   Great Britain........................ 260/40

OTHER PUBLICATIONS
Condensed Chemical Dictionary; Seventh Edition; Reinhold Pub. Corp.; 1966; page 76

Primary Examiner—Lewis T. Jacobs
Attorney—Henry W. Koster

[57] ABSTRACT

The invention relates to thermoplastic molding compositions on the basis of polyoxymethylenes containing antimony trioxide as a nucleating agent. The compositions may be used to produce shaped articles with improved properties.

4 Claims, No Drawings

THERMOPLASTIC MOLDING COMPOSITIONS ON THE BASIS OF POLYOXYMETHYLENES

The present invention relates to thermoplastic moulding compositions on the basis of polyoxymethylenes (POM).

It is known that polyoxymethylenes have a strong tendency to crystallize. Even if the melt is undercooled to a small extent only, a rapid growth of spherulites is observed which, in most cases, are much larger than the length of light waves and confer upon the material a considerable opacity. Moreover, owing to the crystallization process a great number of microscopically small fissures and internal tensions are formed in the interior and on the surface of the material. These fissures and internal tensions detrimentally affect the mechanical properties of shaped articles, for example injection moulded articles, made from polyoxymethylenes. The aforesaid flaws are the more pronounced the larger the individual spherulites.

It is also known that by adding 0.0001 to 0.5 percent by weight of talc to polyoxymethylenes of high molecular weight and uniformly distributing the said inorganic nucleating agent in the organic polymer, the crystal structure of injection moulded articles can be rendered more uniform and hence a structure of coarse spherulites having an average diameter of 100 microns can be transformed into a homogeneous structure in which the spherulites have a diameter of 4 to 8 microns (cf. British Pat. No. 1.133.490). The aforesaid data relate to injection moulded articles which have been crystallized under pressure at a temperature in the range of from 50° to 100°C.

It has also been proposed (in copending application, Ser. No. 60,722) to prepare thermoplastic molding compositions on the basis of polyoxymethylenes having a reduced specific viscosity of from 0.07 to 2.5 dl.g$^{-1}$ and a crystallite melting point of from 150° to 180°C and containing an amount of from 0.0005 to 1.0 percent by weight, relative to the total mixture, of an inorganic nucleating agent, wherein the polyoxymethylene spherulites formed in the isothermal crystallization of the molding composition at 150°C under a pressure of 1 atmosphere have a diameter in the range of from 30 to 250 microns.

The subject of the present invention is a further improvement of the aforementioned thermoplastic moulding compositions which comprises the use of antimony trioxide, as inorganic nucleating agent. In particular antimony trioxide is used in amounts of from 0.005 to 0.4, preferably from 0.02 to 0.2 percent by weight, relative to the total mixture.

Antimony trioxide is preferably employed in the form of its rhomb-shaped crystallized minerals, for example as valentinite, antimony bloom or white antimony. Antimony trioxide which has been obtained by burning antimony in air at a temperature above the melting point of antimony is also well suitable.

The particle diameter of antimony trioxide mostly is in the range of from 0.1 to 10 microns, preferably from 1 to 5 microns.

The moulding compositions of the invention are suitably produced by first mixing polyoxymethylene powder in a high speed mixer (about 1,000 to 2,000 revolutions per minute) with the commonly used stabilizers against oxidation, heat and the action of light, and the inorganic nucleating agent and then transforming the mixture into granules on an extruder at a temperature in the range of from 140° to 240°C, preferably 170° to 220°C.

Polyoxymethylenes in the sense of the present invention are homo- and copolymers of formaldehyde or a cyclic oligomer of formaldehyde, preferably trioxan. By homopolymers there are to be understood those polymers of formaldehyde or a cyclic oligomer of formaldehyde the terminal hydroxyl groups of which have been stabilized against degradation by chemical reaction, for example esterification or etherification.

As polyoxymethylenes there are suitably used copolymers of trioxan and cyclic ethers having 3 to 5 ring members, preferably epoxides, and/or cyclic acetals having 5 to 11 ring members, preferably 5 to 8 ring members, and/or linear polyformals, for example polydioxolane.

Suitable comonomers for trioxan are, above all, compounds of the following formula

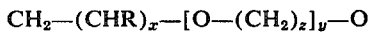

$$CH_2-(CHR)_x-[O-(CH_2)_z]_y-O$$

in which R represents a hydrogen atom, an aliphatic alkyl radical having 1 to 6, preferably 1 to 3, carbon atoms, or a phenyl radical, $x$ is an integer of from 1 to 3 when $y$ is zero, $y$ is an integer of from 1 to 3 when $x$ is zero and $z$ is 2, and $z$ is an integer in the range of from 3 to 6, preferably 3 or 4, when $x$ is zero and $y$ is 1.

As cyclic ether ethylene oxide is especially suitable; styrene oxide, propylene oxide and epichlorohydrin also being well suitable.

Especially suitable cyclic acetals are glycol formal (1,3-dioxolane), butanediol-formal (1,3-dioxepane), and diglycol formal (1,3,6-trioxocane). 4-Chloromethyl-1,3-dioxolane and hexanediol formal (1,3-dioxonane) are also well suitable.

The trioxane copolymers are stabilized against thermal decomposition by hydrolytic degradation to terminal primary alcohol groups.

When mixing the components of the moulding compositions of the invention, stabilizers against the action of heat, oxygen and light may be added. Suitable heat stabilizers are, for example, polyamides, amides of polybasic carboxylic acids, amidines, hydrazines, ureas and poly(N-vinyl-lactams). As oxidation stabilizers phenols, especially bisphenols, and aromatic amines are used and suitable stabilizers against the action of light are derivatives of α-hydroxy-benzophenone and of benzotriazole, the stabilizers being used in an amount of from 0.1 to 10 percent by weight, preferably 0.5 to 5 percent by weight, calculated on the total mixture.

Shaped articles made from the polyoxymethylene compositions nucleated in accordance with the invention have a better ball indentation hardness and stiffness in torsion than shaped articles made from polyoxymethylenes which do not contain a nucleating agent. Moreover, they have a much higher impact strength, determined by a drop test. Shaped articles made from polyoxymethylene compositions in which the size of the spherulites is below 30 microns or above 250 microns have only a slightly improved impact strength, as compared with articles made from polyoxymethylenes which have not been nucleated according to the invention, while articles made from a composition in which the polyoxymethylene spherulites have a size of from 30 to 250 microns have a substantially improved impact strength.

The moulding composition of the invention can be comminuted mechanically, for example by chopping or grinding, into granules, chips, flakes or powders, and processed in the thermoplastic state, for example by injection moulding or extrusion, into shaped articles, for example bars, rods, sheets, films, ribbons and tubes.

The following examples illustrate the invention, the percentages being by weight unless otherwise stated.

EXAMPLE a. A copolymer of 98 percent of trioxan and 2 percent of ethylene oxide, having a density of 1.41 g.ml$^{-1}$, a reduced specific viscosity of 0.70 dl.g$^{-1}$, a melt index of 9.0 g/10 min. and a crystallite melting point of 165°C was mixed with 0.5 percent of bis(2-hydroxy-3-tert-butyl-5-methylphenyl)-methane and 0.1 percent of dicyanodiamide and varying amounts of antimony trioxide, and the mixture was homogenized at 200°C on a single screw extruder. The residence time in the cylinder was about 4 minutes. The nucleating agent had the following particle size distribution:

| | |
|---|---|
| 1 micron and less | 32 % |
| 2 microns | 28 % |
| 3 microns | 21 % |
| 4 microns | 14 % |
| 5 microns and more | 5 % | b. To determine the size of the spherulites in the products obtained films having a thickness of about 10 microns were prepared from the respective polyoxymethylene granules by melting them at 180°C between two glass plates under a pressure of 200 kp.cm$^{-2}$ with subsequent crystallization at 150°C at atmospheric pressure, which films were examined under the microscope.

Furthermore, sheets of dimensions 60 × 60 × 2 millimeters were made from the granules by injection moulding at a temperature of the composition of 200°C and a temperature of the mould of 80°C, which sheets were subjected to a drop test to determine the impact strength. For this purpose a sheet clamped in a frame was subjected to impact by allowing a hammer having a definite weight to fall onto the sheet from different heights. As a measurement for the impact strength there is given the height which is sufficient for the hammer to break 50 percent of the sheets (average value from 40 drop tests).

The reduced specific viscosity (RSV) of the polyoxymethylenes used according to the invention was measured at 140°C in a solution of the polymer in butyrolactone with addition of 2 percent of diphenylamine, the concentration being 0.5 g/100 ml.

The density was measured according to DIN (German Industrial Standards) 53 479.

The melt index was determined according to DIN 53 735 at 190°C under a load of 2.16 kg.

The ball indentation hardness was determined according to VDE (Verband Deutscher Elektrotechniker) 0302 on injection moulded specimens with a time of load of 10 seconds.

The stiffness in torsion was measured according to DIN 53 447 with moulded plates having a thickness of 2 millimeters at a temperature of 120°C with a time of load of 60 seconds.

The mechanical properties of polyoxymethylene which had not been nucleated and polyoxymethylene nucleated according to the invention are indicated in the following table.

The results listed in the table show the superiority of the moulding compositions of the invention (see Examples 1 to 5) which is expressed above all by the impact strength values obtained in the drop test.

TABLE

| Example | Content of valentinite (% by weight) | Size of spherulites (microns) | Height of drop (cm) | Ball indentation hardness (kp/cm$^2$) | Stiffness in torsion (kp/cm$^2$) |
|---|---|---|---|---|---|
| A |  | 621 | 14 | 1430 | 1460 |
| B | 0.0005 | 481 | 24 | 1430 | 1410 |
| C | 0.001 | 373 | 37 | 1435 | 1410 |
| 1 | 0.010 | 197 | 89 | 1440 | 1580 |
| 2 | 0.030 | 87 | 127 | 1435 | 1630 |
| 3 | 0.050 | 60 | 145 | 1445 | 1590 |
| 4 | 0.100 | 51 | 162 | 1455 | 1640 |
| 5 | 0.200 | 35 | 160 | 1465 | 1670 |

We claim:

1. A thermoplastic molding composition consisting essentially of a polyoxymethylene having a reduced specific viscosity of from 0.07 to 2.5 dl/g$^{-1}$ and a crystallite melting point of from 150° to 180°C., and containing from 0.005 to 0.4 percent, based on the total weight of the mixture, of antimony trioxide as nucleating agent, the polyoxymethylene spherulites formed in the isothermal crystallization of the molding composition at 150°C. under a pressure of one atmosphere having a diameter in the range of from 30 to 250 microns.

2. The composition according to claim 1 wherein the amount of antimony trioxide is from 0.02 to 0.2 percent, based on the total weight of the mixture.

3. The composition according to claim 1 wherein the antimony trioxide has a particle diameter mostly in the range of from 0.1 to 10 microns.

4. The composition according to claim 1 wherein the antimony trioxide has a particle diameter in the range of from 1 to 5 microns.

* * * * *